Patented Aug. 7, 1945

2,381,071

UNITED STATES PATENT OFFICE 2,381,071

N-PHOSPHONO-PHOSPHATOALKYL CYCLIC AMINES

James G. McNally and Joseph B. Dickey, Rochester, N. Y., assignors to Eastman Kodak Company, Rochester, N. Y., a corporation of New Jersey No Drawing. Application June 26, 1943, Serial No. 492,445

8 Claims. (Cl. 260—461)

This invention relates to N-phosphono-phosphatoalkyl cyclic amines and to a process for the preparation thereof.

It is known that certain unsaturated compounds, such as cyclohexene, allyl alcohol or aniline, react with phosphorus in the presence of oxygen to give phosphorus derivatives which, upon treatment with water, yield phosphinatophosphato compounds (Berichte 47, 2802–2814, 1914).

We have now found that N-alkenyl cyclic amines react with phosphorus in the presence of oxygen to give phosphorus derivatives which, upon treatment with oxygen, in the presence of water, yield N-phosphono-phosphatoalkyl cyclic amines. It is, accordingly, an object of our invention to provide new N-phosphono-phosphatoalkyl cyclic amines. A further object is to provide a process for preparing such amines. Other objects will become apparent hereinafter.

In accordance with our invention, we react a N-alkenyl cyclic amine with phosphorus in the presence of oxygen and then react the resulting product with oxygen and water. The products obtained by reacting the N-alkenyl cyclic amines which we employ in practicing our invention can be represented by the following general formula:

D=N—R—CH=CH—R' wherein R represents a hydrocarbon alkylene group, R' represents a hydrocarbon group and D represents the remainder of a cyclic amine. When a N-alkenyl cyclic amine of the above general formula is reacted with phosphorus in the presence of oxygen, a compound of the following general formula is produced:

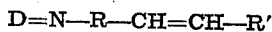

wherein R, R' and D have the values set forth above. When a compound of this second general formula is treated with water and oxygen, in accordance with our invention, a N-phosphono-phosphatoalkyl cyclic amine of the following general formula is produced:

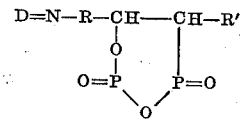

wherein R, R' and D have the above referred-to values.

It is believed that the manner of practicing our invention is illustrated by the following examples. These examples are not intended to limit our invention.

*Example 1.—N-methyl-N-(γ-phosphono-β-phosphatopropyl)-aniline*

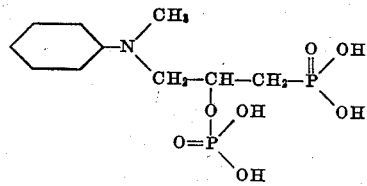

144 g. (1 mole) of N-methyl-N-allylaniline were dissolved in benzene. To the solution were added 62 g. (2 moles) of yellow phosphorus. The mixture was placed in a pressure bottle and shaken with oxygen until 64 g. (2 moles) had been absorbed. This absorption of oxygen is usually complete in about 24 hours. The resulting white solid, having the formula:

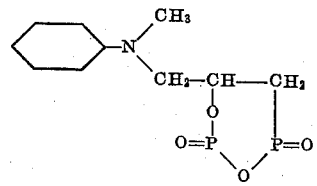

was filtered off and added to 500 cc. of water. Air was passed into the resulting mixture for six hours. The water was then removed from the mixture under reduced pressure. A colorless solid residue of N-methyl-N-(γ-phosphono-β-phosphatopropyl)-aniline remained. It had no definite melting point and could not be distilled.

*Example 2.—N-(n-butyl)-N-(γ-phosphono-β-phosphatopropyl)-m-toluidine*

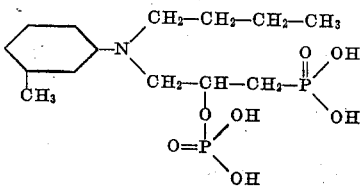

203 g. (1 mole) of N-(n-butyl)-N-allyl-m-toluidine were dissolved in 500 cc. of benzene and 62 g. (2 moles) of finely divided yellow phosphorus were placed in a pressure bottle and shaken under an oxygen pressure of about two atmospheres until the gauge indicated that 64 g. (2 moles) of oxygen had been absorbed. About 24 hours usually suffices for this operation. The white solid thus obtained was separated by filtration and added to 500 cc. of water. Air was passed into the aqueous mixture for 6 hours. The water was then removed from the mixture under reduced pressure. A colorless solid residue of N-(n-butyl) - N - (γ - phosphono - β - phosphatopropyl)-m-toluidine was obtained. This compound is readily hydrolyzed with dilute alkali or acid to N-(n-butyl)-N-(γ-phosphono-β-hydroxypropyl)-m-toluidine, a colorless compound. Both of these compounds are soluble in water, ethyl alcohol and dilute acetic acid. Neither compound has a definite melting point nor can be distilled. The N-(n-butyl)-N-allyl-m-toluidine employed in this example was prepared by condensing N-(n-butyl)-m-toluidine with allyl chloride, in the presence of sodium carbonate.

*Example 3.—N-(β-hydroxyethyl) - N - (γ - phosphono - β - phosphato - n-butyl)-2-methoxy-5-methylaniline*

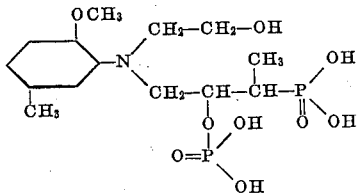

235 g. (1 mole) of N-(β-hydroxyethyl)-N-crotyl-2-methoxy-5-methylaniline were dissolved in 500 cc. of benzene. To the solution were added 62 g. (2 moles) of yellow phosphorus. The mixture was placed in a pressure bottle and shaken with oxygen until 64 g. (2 moles) had been absorbed. The absorption of oxygen is usually complete in 24 hours. The resulting white solid was filtered off and added to 500 cc. of water. Air was passed into the resulting mixture for 6 hours. The water was then removed from the mixture under reduced pressure. A colorless solid residue of N-(β-hydroxyethyl)-N-(γ-phosphono-β-phosphato-n-butyl) - 2-methoxy-5-methylaniline remained. This compound can be readily hydrolyzed with dilute alkali or acid to give N-(β-hydroxyethyl)-N-(γ - phosphono -β - hydroxy-n-butyl)-2 - methoxy-5-methylaniline having the following formula:

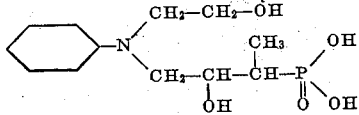

This compound forms a stable salts with mineral acids and is soluble in ethyl alcohol, acetic acid, dilute hydrochloric acid and water. The N-(β-hydroxyethyl) - N - crotyl-2-methoxy- 5-methylaniline used in this example was prepared by condensing equimolecular amounts of N-(β-hydroxyethyl)-2-methoxy - 5 - methylaniline and crotyl chloride, at the temperature of a boiling water bath, in the presence of sodium carbonate. Upon washing the reaction mixture with water to remove salts and distilling under reduced pressure, N-(β - hydroxyethyl) - N - crotyl - 2-methoxy-5-methylaniline, boiling at 190° to 195° C. at 8 mm. of mercury pressure, was obtained. N-(β-hydroxyethyl) - 2 - methoxy - 5-methylaniline was prepared by condensing 2-methoxy-5-methyl aniline with an equimolecular amount of ethylene oxide at 180° C. in an autoclave. It boils at 170° to 175° C. at 10 mm. of mercury pressure. The term "crotyl" as used in this entire specification is intended to mean the radical of the formula: —CH₂—CH=CH—CH₃.

*Example 4.—N-(γ-phosphono-β-phosphatopropyl)-α-naphthylamine*

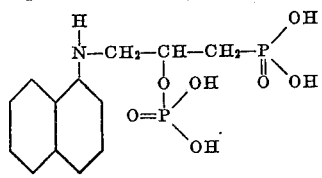

183 g. (1 mole) of N-allyl-α-naphthylamine were dissolved in 500 cc. of benzene. To the solution were added 62 g. (2 moles) of yellow phosphorus. The mixture was placed in a pressure bottle and shaken with oxygen under a pressure of 2 atmospheres until 64 g. (2 moles) had been absorbed. The absorption of oxygen is usually complete in about 24 hours. The resulting white solid was filtered off and placed in 500 cc. of water. Air was passed into the aqueous mixture for 6 hours. The water was removed from the mixture under reduced pressure. A colorless solid residue of N-(γ-phosphono-β-phosphatopropyl)-α-naphthylamine remained. Upon hydrolysis with dilute mineral acid or alkali N-(γ-phosphono-β-hydroxypropyl) - α-naphthylamine was formed, a colorless compound. Both of these compounds have indefinite melting points and cannot be distilled. They are soluble in alkalies, dilute mineral acids, ethyl alcohol, dilute acetic acid and 1,4-dioxane. The N-allyl-α-naphthylamine used in this example was prepared by condensing α-naphthylamine with allyl chloride, in the presence of sodium carbonate. The slightly yellow compound boiled at 195° to 198° C. at 18 mm. of mercury pressure.

*Example 5.—N - (γ-hydroxypropyl) -N- (γ-phosphono - β - phosphatopropyl)-3-acetamino-6-ethoxyaniline*

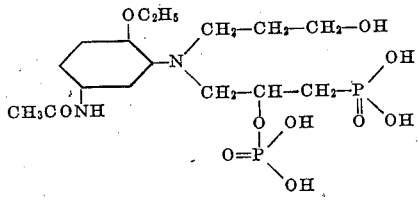

252 g. (1 mole) of N-(γ-hydroxypropyl)-N-allyl-3-acetamino-6-ethoxyaniline were dissolved in 500 cc. of benzene. To the solution were added 62 g. (2 moles) of yellow phosphorous. The mixture was placed in a pressure bottle and shaken with oxygen, under 2 atmospheres pressure, until 64 g. (2 moles) of oxygen were absorbed. The absorption of oxygen is usually complete in about 24 hours. The resulting white solid reaction product was filtered off and placed in 750 cc. of water. Air was passed in the resulting mixture for 6 hours. The water was removed under reduced pressure. A colorless residue of N-(γ-hydroxypropyl) -N- (γ-phosphono -β- phosphatopropyl)-3-acetamino-6-ethoxyaniline remained. The compound was hydrolyzed by warming on a steam bath with 5 per cent aqueous sodium hydroxide. The sodium salt of N-(γ-hydroxypropyl) -N- (γ-phosphono-β-hydroxypropyl) -3-acetamino-6-ethoxyaniline was recovered by removal of the water under reduced pressure. The N-(γ-hydroxypropyl) -N-allyl -3-acetamino -6- ethoxyaniline used in this example was prepared as follows: γ-hydroxypropyl chloride (1.25 moles) was added slowly with stirring at 130° C. to a mixture of 0.63 mole of sodium carbonate and 1 mole of 3-acetamino-6-ethoxyaniline. Heating and stirring at 130° C. was continued for 6 hours. At the end of this time 0.55 mole of sodium carbonate and 1.1 moles of allyl chloride were added with stirring and heating at 130° C. Heating at 130° C. was continued until no more carbon dioxide was evolved. The mixture was then cooled and water added to dissolve the salt. The water insoluble portion was distilled under reduced pressure and N-(γ-hydroxypropyl)-N-allyl-3- acetamino -6- ethoxyaniline boiling at 270° to 275° C. at .5 to 5 mm. of mercury was obtained.

*Example 6.—N-(γ-keto-n - butyl) -N- (α-phosphono-γ-phosphato-2-butyl) -2-(n-butoxy) -5-methylaniline*

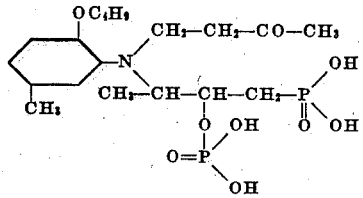

303 g. (1 mole) of N-(γ-keto-n-butyl)-N-(2-butenyl -1)-2-(n-butoxy)-5-methylaniline were dissolved in 1 liter of benzene. To the solution were added 62 g. (2 moles) of yellow phosphorus. The mixture was placed in a pressure bottle and shaken with oxygen, under 40 pounds per square inch pressure, until 64 g. (2 moles) of oxygen were absorbed. The absorption of oxygen is usually complete in about 24 hours. The white reaction product was filtered off and added to one liter of water. Air was passed into the aqueous mixture for 6 hours. The water was removed under reduced pressure leaving a colorless viscous mass of N-(γ-keto-n-butyl)-N-(α-phosphono -γ-phosphato-2-butyl)-2- (n-butoxy)-5-methylaniline, soluble in dilute alkali. The N-(γ-keto-n-butyl) -N- (2-butenyl-1)-2-(n-butoxy)-5-methylaniline used in this example was prepared by condensing N-(γ-keto-n-butyl)-2-(n-butoxy)-5-methylaniline with α-methylallyl chloride, in the presence of sodium carbonate. It boils at 250° to 255° C. at 0.25 mm. of mercury pressure. The N- (γ-keto-n-butyl) -2 -(n-butoxy)-5-methylaniline was prepared by mixing one mole of 2-amino-4-methylphenyl-n-butyl ether with vinyl methyl ketone and allowing the mixture to stand for 24 hours, followed by heating under reflux for 5 hours. The mixture is then steam distilled to remove unreacted 2-amino-4-methylphenyl-n-butyl ether.

*Example 7.—N-cetyl-N-(γ-phosphono-phosphatopropyl)-3-methyl aniline*

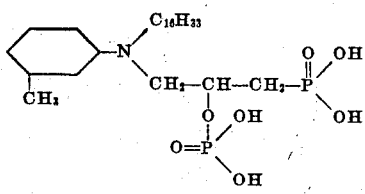

371 g. (1 mole) of N-cetyl-N-allyl-3-methyl aniline were dissolved in 500 cc. of benzene. To the solution were added 62 g. (2 moles) of yellow phosphorus. The mixture was placed in a pressure bottle and shaken with oxygen, under two atmospheres pressure until 64 g. (2 moles) of oxygen were absorbed. The absorption of oxygen is usually complete in about 24 hours. The resulting white solid reaction product was filtered off and placed in 750 cc. of water. Air was passed into the resulting mixture for 6 hours. The water was removed under reduced pressure. A colorless residue of N-cetyl-N-(γ-phosphono-β-phosphatopropyl)-3-methylaniline remained. The compound was hydrolyzed by dissolving in water with two molecular proportions of hydrochloric acid and heating the mixture to boiling for a short time. Upon cooling, the hydrochloric acid was neutralized and the N-cetyl-N-(γ-phosphono -β- hydroxypropyl)-3-methylaniline was salted out, filtered off and dried. One molecular proportion of this hydroxy derivative was dissolved in two molecular proportions of hydrochloric acid. To the resulting solution was added one molecular proportion of sodium nitrite. Upon making the resulting mixture alkaline with sodium carbonate, a nitroso derivative separated and this was filtered off and charged into a shaking autoclave with 10 g. of Raney nickel and 500 cc. of ethanol. The resulting mixture was reduced with hydrogen at 80° to 110° C. When 2 molecular proportions of hydrogen were absorbed, the autoclave was cooled and the product removed. The reaction product was warmed on a steam bath with 2 liters of ethanol and then filtered to remove the nickel catalyst. Sufficient 2-N-hydrochloric was added to neutralize the base in the alcoholic solution. The alcohol was then removed under reduced pressure. The remaining white product which was slightly soluble in hot water has the following formula:

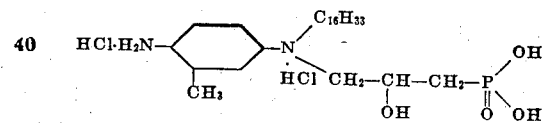

*Example 8.—N-(γ-phosphono - β - phosphatopropyl)-7-methyl-1,2,3,4-tetrahydroquinoline*

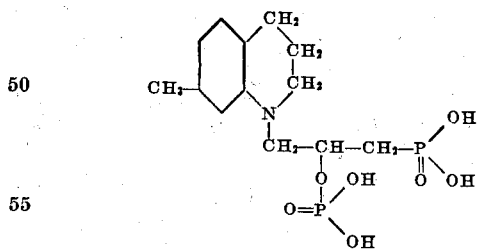

171 g. (1 mole) of N-allyl-7-methyl-1,2,3,4-tetrahydroquinoline were dissolved in 500 cc. of benzene. To this solution were added 62 g. (2 moles) of yellow phosphorus. The mixture was placed in a pressure bottle and shaken with oxygen, under a pressure of 45 pounds per square inch, until 64 g. (2 moles) of oxygen were absorbed. The absorption of oxygen is usually complete in about 24 hours. The resulting white solid material was filtered off and added to 500 cc. of water. Air was passed into the resulting mixture for 6 hours. The water was then removed from the mixture under reduced pressure. A colorless solid residue of N-(γ-phosphono-β-phosphatopropyl)- 7 -methyl-1,2,3,4-tetrahydroquinoline remained. Upon hydrolysis, as in Example 7, N-(γ-phosphono-β-hydroxypropyl)-7-methyl-1,2,3,4-tetrahydroquinoline was obtained.

Both compounds are colorless, have no definite melting point, are soluble in water, ethyl alcohol, acetic acid and dilute mineral acids. The N-allyl-7-methyl-1,2,3,4-tetrahydroquinoline used in this example was prepared by condensing 7-methyl-1,2,3,4-tetrahydroquinoline with allyl chloride, in the presence of sodium carbonate, on the steam bath. It boiled at 150° C. at 18 mm. of mercury pressure. 7-Methyl-1,2,3,4-tetrahydroquinoline was prepared by hydrogenating 7-methylquinoline at 110° C. for Raney nickel. It boiled at 140° C. at 20 mm. of mercury pressure.

*Example 9.—N-($\gamma$-phosphono-$\beta$-phosphatopropyl)-2-methylbenzomorpholine*

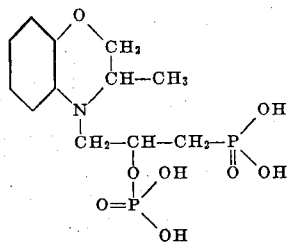

173 g. (1 mole) of N-allyl-2-methylbenzomorpholine were dissolved in 500 cc. of benzene. To this solution were added 62 g. (2 moles) of yellow phosphorus. The mixture was placed in a pressure bottle and shaken with oxygen, under a pressure of 45 pounds per square inch, until 64 g. (2 moles) of oxygen were absorbed. The absorption of oxygen is usually complete in about 24 hours. The resulting white solid material was filtered off and added to 500 cc. of water. Air was passed into the resulting mixture for 6 hours. The water was then removed from the mixture under reduced pressure. A colorless solid, water-soluble residue of N-($\gamma$-phosphono-$\beta$-phosphatopropyl)-7-methylbenzomorpholine, having no definite melting point, remained. The N-allyl-2-methylbenzomorpholine used in this example was prepared by condensing one mole of 2-methylbenzomorpholine with 1.1 moles of allyl chloride, in the presence of 0.55 moles of sodium carbonate until no more carbon dioxide was evolved. The product was washed with water and distilled under reduced pressure. N-allyl-2-methylbenzomorpholine boils at 140° to 145° C. at 17 mm. of mercury pressure.

We have also found that alkenyl aryl ethers and alkenyl substituted amides can be reacted with phosphorus and oxidized in a similar manner. The following examples will serve to illustrate these reactions.

*Example 10.—$\gamma$-Phosphono-$\beta$-phosphatopropyl-m-dimethylaminophenyl ether*

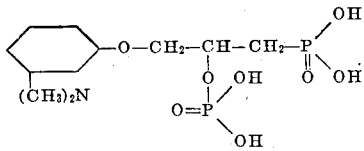

177 g. (1 mole) of allyl m-dimethylaminophenyl ether were dissolved in 500 cc. of benzene. To the resulting solution were added 62 g. (2 moles) of finely divided yellow phosphorus. The mixture was placed in a pressure bottle and shaken with oxygen, under 2 atmospheres pressure, until 64 g. (2 moles) of oxygen were absorbed. The required amount of oxygen is usually absorbed in about 24 hours. The resulting white solid was filtered off and added to 1500 cc. of water. Air was passed into the aqueous mixture for from 5 to 6 hours. The water was then removed under reduced pressure leaving a colorless residue of $\gamma$-phosphono-$\beta$-phosphatopropyl-m-dimethylaminophenyl ether which is soluble in dilute alkali and has no definite melting point. The allyl m-dimethylaminophenyl ether used in this example was prepared as follows: one mole of m-dimethylaminophenol and two moles of sodium hydroxide were dissolved in 1500 cc. of water. The solution was heated at 95° to 100° C. and 1.1 moles of allyl chloride were added slowly over a period of two hours. Heating at 95° to 100° C. was continued until all the allyl chloride had reacted. The m-dimethylaminophenylallyl ether was extracted with benzene and distilled under reduced pressure. It boiled at 145° to 150° C. at 10 mm. of mercury pressure.

*Example 11.—N-($\beta$-methoxyethyl)-N-($\gamma$-phosphono-$\beta$-phosphatopropyl carbamidomethyl)-aniline*

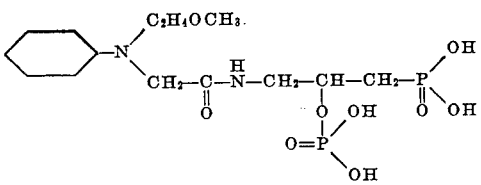

248 g. (1 mole) of N-($\beta$-methoxyethyl)-N-allyl-carbamidomethylaniline were dissolved in 500 cc. of benzene. To the resulting solution were added 62 g. (2 moles) of finely divided yellow phosphorus. The mixture was placed in a pressure bottle and shaken with oxygen, under two atmospheres pressure, until 64 g. (2 moles) of oxygen were absorbed. The required amount of oxygen is usually absorbed in 24 hours. The resulting white solid material was filtered off and added to 1500 cc. of water. Air was passed into the aqueous mixture for from 5 to 6 hours. The water was then removed under reduced pressure leaving a colorless residue of N-($\beta$-methoxyethyl)-N-($\gamma$-phosphono-$\beta$-phosphatopropyl carbamidomethyl)-aniline. The N-($\beta$-methoxyethyl)-N-allylcarbamidomethylaniline used in this example was prepared as follows: one mole of methyl chloracetate was dissolved in 1000 cc. of ethanol. The solution was cooled to from −5° to 0° C. To the cooled solution was added dropwise with stirring over a period of 5 hours, 1 mole of allylamine, keeping the temperature below 0° C. After the allylamine had been added, 1 mole of sodium bicarbonate was added followed by 1 mole of $\beta$-methoxyethylaniline. The mixture was slowly warmed to 80° C. and kept at that temperature until no more carbon dioxide was evolved. The mixture was then steam distilled to remove the ethanol and any unchanged $\beta$-methoxyethylaniline or allylamine. The N-($\beta$-methoxyethyl)-N-allyl carbamidomethylaniline was extracted from the aqueous residue with benzene. The $\beta$-methoxyethylaniline was prepared by heating at 220° C. for 24 hours, 1 gram-mole of aniline, 5 grams of Raney nickel catalyst and 1.5 moles of ethylene glycol monomethyl ether. When cooled, the reaction product was fractionated and there was obtained $\beta$-methoxyethylaniline boiling at 130° C. at 13 mm. of mercury pressure.

The term "alcohol radical," in accordance with customary usage, is intended to mean an organic radical which corresponds to an alcohol and is derived therefrom by dropping the hydroxyl group, e. g. n-propyl is derived from n- propyl alcohol by dropping the OH group, benzyl is derived from benzyl alcohol by dropping the OH group, and tertiary butyl is derived by dropping the OH from tertiary butyl alcohol.

This application is a continuation-in-part of our copending application Serial No. 368,660, filed December 5, 1940.

What we claim as our invention and desire to be secured by Letters Patent of the United States is:

1. A process for preparing a N-phosphono-phosphato-alkyl aryl amine comprising reacting a N-alkenyl aryl amine with phosphorus and oxygen and reacting the resulting reaction product with oxygen and water.

2. A process for preparing a N-phosphono-phosphato-alkyl aryl amine comprising reacting a N-alkenyl aryl amine of the following formula:

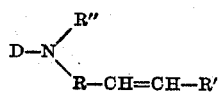

wherein R represents a hydrocarbon alkylene group, R' represents a hydrocarbon alkyl group, R'' represents an alcohol radical and D represents a monocyclic aryl group of the benzene series, with phosphorus and oxygen and reacting the resulting product with oxygen and water.

3. A process for preparing a N-phosphono-phosphato-alkyl aryl amine comprising reacting a N-alkenyl aryl amine of the following formula:

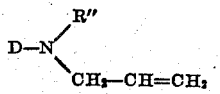

wherein R'' represents an alcohol radical and D represents a monocyclic aryl nucleus of the benzene series, with phosphorus and oxygen and reacting the reacting product with oxygen to water.

4. A N-phosphono-phosphatoalkyl aryl amine of the following formula:

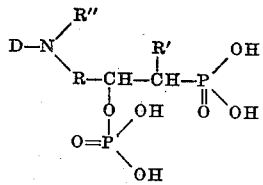

wherein R represents a hydrocarbon alkylene group, R' represents a hydrocarbon alkyl group, R'' represents an alcohol radical and D represents a monocyclic group of the benzene series.

5. A N-phosphono-phosphatoalkyl aryl amine of the following formula:

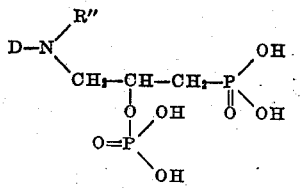

wherein R'' represents an alcohol radical and D represents a monocyclic group of the benzene series.

6. N - methyl-N-(γ-phosphono-β-phosphatopropyl)-aniline.

7. N-(β - hydroxyethyl) - N-(γ-phosphono-β-phosphato - n - butyl) - 2 - methoxy-5-methyl-aniline.

8. N - (γ - phosphono-β-phosphatopropyl)-7-methyl-1,2,3,4-tetrahydroquinoline.

JAMES G. McNALLY.
JOSEPH B. DICKEY.